Patented July 7, 1942

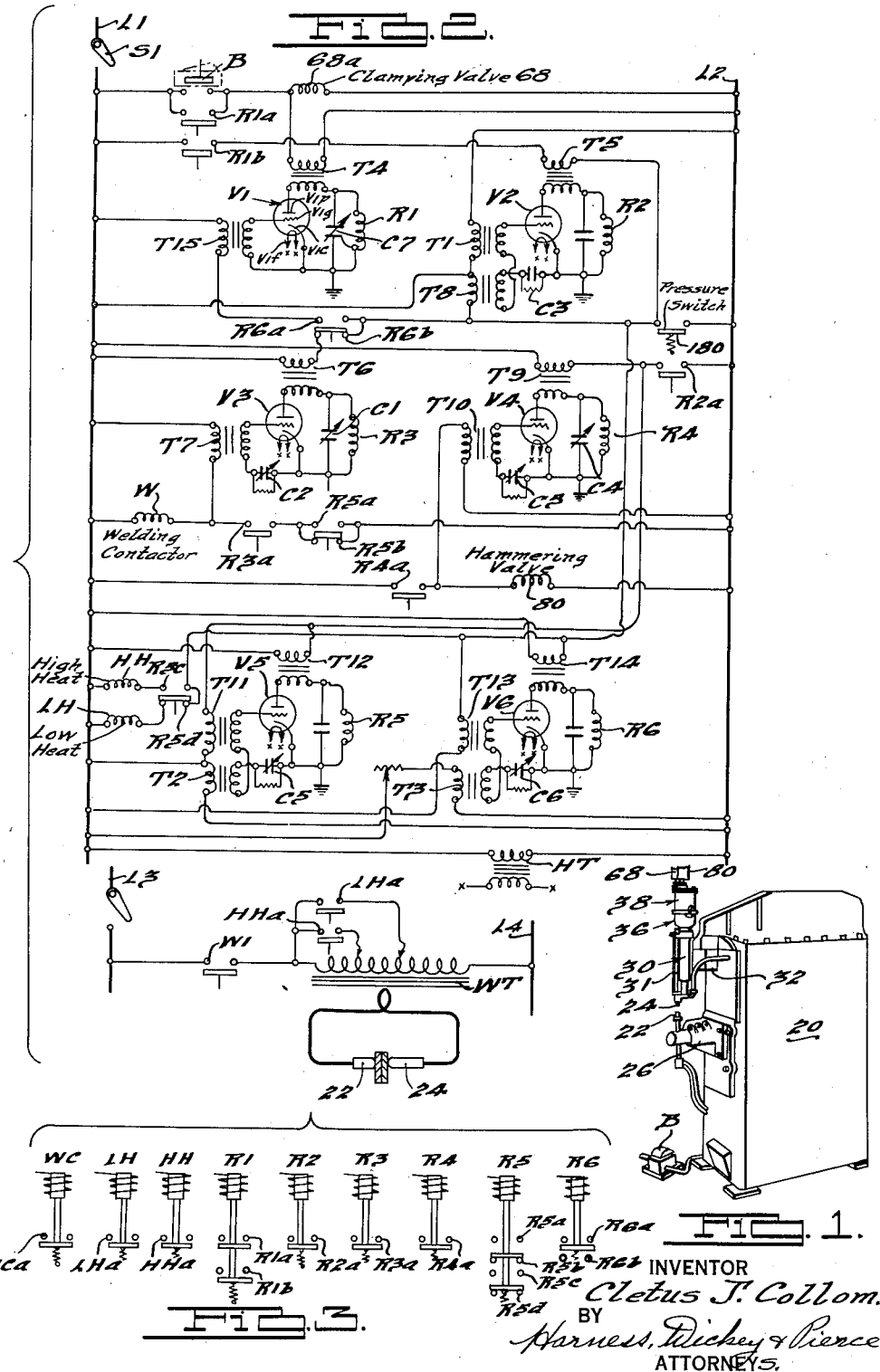

2,289,322

UNITED STATES PATENT OFFICE 2,289,322

TIMER

Cletus J. Collom, Detroit, Mich., assignor to Weltronic Corporation, Detroit, Mich., a corporation of Michigan Application August 2, 1940, Serial No. 349,616

14 Claims. (Cl. 250—27)

The present invention relates to timing control systems, and is particularly directed to the provision of an improved timing control system for electric welding.

Various electric welding systems have heretofore been proposed, characterized in that the workpieces to be welded are subjected to the heating action of an electric current, which heating action serves to bring the contacting portions of the workpieces to a welding temperature, the actual weld being completed by applying a predetermined pressure between such contacting surfaces. In certain of these systems, the heating current is continuously applied for a sufficiently long interval to bring the workpieces to the welding temperature and in other of these systems, the heating current is applied in a succession of impulses. With both systems, it is frequently found desirable to maintain the welding pressure between the workpieces for a so-called cooling period after the current is interrupted.

It has been found that the welding action can be made considerably more uniform and efficient, and that the welding processes themselves can be extended to types of work heretofore considered unsuited for electric welding, if the workpieces are subjected, in the region being heated and during at least a part of the heating action, to a succession of hammer-like blows. It is preferred to begin the hammer-like blows during the flow of heating current, and in a generic aspect of the invention, the hammer-like blows may be interrupted before, simultaneously with, or after the interruption of flow of heating current. More specifically, it is preferred to interrupt the hammer-like blows at approximately the same time that the welding current is interrupted and to thereafter maintain the workpieces under the initial contact pressure for the so-called cooling period. In a further generic aspect of the invention, the welding current may be maintained uniform throughout the entire welding action, but in a more specific sense, it is preferred to increase the value of the heating current during the hammering action.

With the foregoing considerations in view, the principal objects of the present invention are to provide an improved timing control system for accurately timing the operations involved in the aforesaid process; to provide such a timing system, which is simple in arrangement, economical of manufacture, and reliable in operation; to provide such a timing system embodying electronic valve elements and associated timing means to effect the various timing operations; and to provide electronic timing arrangements of generally improved characteristics.

With the above as well as other objects in view, a preferred but illustrative embodiment of the invention is shown in the accompanying drawing, throughout the several views of which corresponding reference characters are used to designate corresponding parts and in which:

Figure 1 is a view in perspective of an illustrative stationary welding machine, which may be used in the practice of the invention;

Fig. 2 is a diagrammatic view of a timing system embodying the invention; and,

Fig. 3 is a diagrammatic view illustrating the structural relationship between the movable contact members and the coils shown in Fig. 2.

It will be appreciated from a complete understanding of the present invention that the present improved timing system is applicable to a wide variety of applications, and that in its broader aspects, the details of the system may be considerably varied within the scope of the invention.

Referring first to Fig. 1, an illustrative machine to which the present timing system may be applied, may comprise generally, an enclosing frame structure 20, which may form a housing for the welding transformer and for certain of the timing control units. The frame 20 supports a pair of electrodes 22 and 24. The electrode 22 is stationary and is rigidly but adjustably supported upon a bracket 26, which is secured to and extends forwardly from the front face of the frame 20. The bracket 26 is preferably formed of conductive material and is, therefore, insulated from the machine. Illustrative lines 28 are provided for circulating coolant through the stationary electrode 22. The movable electrode 24 is carried by a gun 30, which gun is carried by a support 32, which projects forwardly from the machine. The support 32 constitutes one terminal of the welding circuit and is thus insulated from the previously described support 26. It will be appreciated that suitable connections (not shown) between the supports 26 and 32 and the secondary winding of the welding transformer are made inside the frame structure 20. An illustrative circuit for applying coolant to the movable electrode 24 is indicated at 34.

For the purposes of the present description, it is sufficient to note that the gun 30 embodies a plunger or other fluid pressure responsive element, which upon being actuated, forces the electrode 24 downwardly into clamping engagement with workpieces positioned between the electrodes 22 and 24. Upon release of the just-mentioned fluid pressure, suitable means, such as the spring plunger 31, operates to restore the electrode 24 to the illustrated retracted position. The means for subjecting the gun 30 to the just-mentioned fluid pressure comprises a clamping ram 36 and a hammering ram 38, which are arranged in alignment with each other above the gun, it being understood that the piston rod of the ram 36 may directly engage the aforementioned plunger so as to apply the clamping pressure between the electrodes and that the piston rod of the ram 38 may directly engage the piston or piston rod of the ram 36, so as to apply the hammering pressure. The previously mentioned spring plunger 31 may serve as the return means for the ram 36, but the ram 38 is preferably provided with means to elevate its piston upon relief of the fluid pressure in the ram 38.

The ram 36 is provided with an electromagnetically operated valve 68, which may be of usual construction and which in the de-energized position disconnects the ram 36 from the source of supply (preferably oil or other inelastic fluid) and connects the same to exhaust. The ram 38 is provided with a similar electromagnetically controlled valve 80, which in the de-energized position disconnects the ram 38 from a source of fluid, preferably an elastic fluid, such as air, and connects the same to exhaust. So long as the valve 68 is energized, however, a clamping pressure is maintained in the ram 36, which clamps the work between the electrodes 22 and 24. Also, by periodically energizing and de-energizing the valze 80, the ram 38 is caused to apply hammer blows, through the ram 36, to the electrode 24.

Referring particularly to Fig. 2, the timing control system is of the electronic type employing a series of electric valves V1, V2, V3, V4, V5, and V6, each whereof is of the usual four-element type, embodying an anode, a cathode, a control grid and a heater or filament. These elements of the valve V1 are designated, respectively, as Vp, Vc, Vg and Vf. The several valves V1, etc., may be and preferably are of the type which are conducting so long as the anodes thereof are positive with respect to the cathodes and so long as the potential of the grid relative to the cathode is above a predetermined value. If the potential of the grid assumes a value below the predetermined value, however, the valve becomes nonconducting. Briefly, the valve V1 controls the starting of a complete operating cycle and provides for a predetermined time delay between the interruption of the flow of welding current and the release of the pressure upon the work. The valve V2 serves to delay the initiation of the hammering action. The valve V3 controls the initiation of the flow of welding current, and also causes such current to be supplied as a succession of impulses. The valve V4 provides the hammering action by successively rendering the hammering rams effective and ineffective. The valve V5 controls the change in value of the heating current and, more specifically, increases the heating current from an initially low value to a final high value at an appropriate stage of the welding cycle. The remaining valve, V6, controls the over-all length of the welding period. The several valves have various timing elements and relays individually associated therewith, all whereof can best be described in connection with a description of operation of the system as a whole.

The system of Fig. 2 also employs a pressure switch 180, which serves, as described below, to control certain of the welding operations. The pressure switch 180 may be of usual type, arranged to occupy a normally open position, but to move to and remain closed so long as the pressure between the electrodes is at or above a predetermined value.

In Fig. 2, the coils of the various relays and contactors R1, R2, R3, R4, R5, R6, W, LH and HH are shown separated from the various contacts operated thereby. The operating relation between these contacts and coils is, however, shown in Fig. 3.

Considering now the operation of the control system shown specifically in Fig. 2, the control circuits are supplied with power from line conductors L1 and L2, and may be placed in readiness for operation by closure of the line switch S1. The load circuits, in turn, are supplied from line conductors L3 and L4, and may be conditioned for operation by closure of the usual line switch S2. The initial closure of the line switch S2 is without effect, since the welding contactor W is de-energized and the contacts W1 thereof are open. The closure of the line switch S1 completes obvious energizing circuits for the primary windings of control transformers T1, T2 and T3, which are associated, respectively, with the valves V2, V5 and V6, and also energizes the usual heater transformer HT. The terminals of the secondary winding of the transformer HT are designated $x$—$x$, and the terminals of the filaments of the various valves V1, V2, V3, V4, V5 and V6 are correspondingly designated, it being understood that so long as transformer HT is energized, it supplies heating current to the filaments of all of the valves.

Upon being energized, the transformer T1 applies a blocking potential to the grid of valve V2, thereby rendering the same temporarily non-conducting. The transformers T2 and T3, upon being energized, apply similar blocking potentials to the grids of valves V5 and V6, thereby rendering these valves temporarily non-conducting.

Assuming it is desired to effect a welding operation, the starting switch B, which may be a foot treadle operated switch, as shown in Fig. 1, or any other suitable form of switch, may be closed. This action immediately completes obvious energizing circuits for the coil 68a of the clamping ram valve 68 and for the primary winding of the control transformer T4. The energization of the solenoid 68a causes the valve 68 to apply actuating pressure to the clamping ram 36 (Fig. 1), thereby bringing the associated movable electrode 24 into contact with the work and clamping the same between the movable and the stationary electrodes.

The energization of transformer T4 applies an alternating potential to the valve V1 and under the conditions stated, this valve is in a conducting condition since the grid thereof is at the same potential as the cathode. Consequently, valve V1 passes current to energize the control relay R1, which thereupon closes its contacts R1a and R1b. Contacts R1a complete a holding circuit around the starting switch B, which may thereupon be released to the open position without interrupting the operating cycle.

The closure of the contacts R1b prepares an energizing circuit for the primary winding of the control transformer T5, which circuit, however, is not completed until the pressure switch 180 closes, which action may be expected to take somewhat more time than is required for the operation of the relay R1.

When the pressure built up between the electrodes reaches a predetermined value, the pressure switch 180 closes, thereby immediately actuating the relay R3 to initiate the flow of welding current and also introducing a train of operations which results, after a predetermined time delay, in the actuation of the hammering action. More specifically, closure of the pressure switch completes an obvious circuit through the normally closed contact R6b of the control relay R6 for the primary winding of the control transformer T6, which thereupon becomes effective to apply an alternating potential to the valve V3. Under the conditions stated, the grid of the valve V3 is at the same potential as the cathode, and valve V3 is, therefore, in a conducting condition. The energization of transformer T6, therefore, causes valve V3 to pass a current which energizes the relay R3, which thereupon closes its normally open contact members R3a. The closure of contacts R3a completes an energizing circuit for the coil of the welding contactor W, which thereupon closes its normally open contacts W1. Closure of the latter contacts energizes the primary winding of the welding transformer WT, which thereupon initiates the flow of welding current between the welding electrodes, which are designated 22 and 24 in Figs. 1 and 2. The closure of pressure switch 180 also energizes the low heat contactor LH, which thereupon closes its contacts LHa to adjust the transformer WT for low heat operation, which action slightly precedes the actuation of the welding contactor W.

The closure of contacts R3a also energizes the primary winding of the control transformer T7, which thereupon applies a blocking potential to the grid of the valve V3, rendering the latter non-conducting and enabling the energy stored in the coil of the relay R3 to discharge through the timing condenser C1. At the expiration of an interval determined by the value of the condenser C1 and the remaining elements of the associated local circuit, relay R3 becomes de-energized and restores contacts R3a to the open position. This latter action interrupts the circuit for the coil of the welding switch, which thereupon opens its contacts W1 and interrupts the flow of welding current. The opening of contacts R3a also de-energizes the transformer T7, enabling the energy stored thereby in the grid condenser C2, associated with valve V3, to dissipate itself, progressively lowering the potential of the grid of valve V3. At the expiration of a period determined by the condenser C2, the valve V3 is again rendered conducting. This latter action again energizes relay R3, which thereupon acts to close the welding circuit, as described above. Also, the re-energization of relay R3 re-energizes the transformer T7, which action results in the de-energization of relay R3 and the interruption of the welding circuit. So long, therefore, as transformer T6 remains energized, valve V3 is effective to periodically energize and de-energize relay R3, thereby correspondingly closing and opening the welding circuit and causing the work circuit to be supplied with successive impulses of current.

The closure of the pressure switch also conditions the control relay R2 for operation, which relay delays the operation of the hammering relay R4. More specifically, closure of the pressure switch immediately completes the circuit, through the now closed contacts R1b, for the transformer T5 and also completes the circuit for the control transformer T8. The energization of transformer T5 applies an alternating potential to the valve V2, but under the conditions stated, valve V2 is non-conducting because of the original energization of transformer T1. Transformers T2 and T8 are, however, differentially connected and upon energization of the transformer T8, the voltages thereof balance or substantially balance each other, enabling the timing condenser C3, associated with the grid of the valve V2 to dissipate the energy stored therein. After a period determined by the characteristics of condenser C3 and the associated discharge circuit, the grid of valve V2 falls to a value at which this valve is conducting. At this time, relay R2 is immediately energized and closes its contacts R2a, which action directly energizes the primary winding of control transformer T9, which thereupon applies an alternating potential to the valve V4. Under the conditions stated, the grid transformer T10, associated with valve V4, is de-energized, so that the grid thereof is at the same potential as the cathode. Consequently, valve V4 is in a conducting condition and in response to the energization of transformer T9, control relay R4 is energized and closes its contacts R4a. The closure of contacts R4a directly energizes the solenoid of the hammering valve 80 and also energizes the grid transformer T10. Grid transformer T10, upon being energized, applies a blocking potential to the grid of the valve V4, which thereupon becomes non-conducting. Relay R4 remains energized, however, for a period determined by the timing condenser C4, at the expiration of which period, relay R4 resumes the de-energized position, opening contacts R4a. The latter action de-energizes the hammering valve 80 and also de-energizes the control transformer T10. Thereafter, at the expiration of a period determined by the characteristics of the grid condenser C5, associated with valve V4, valve V4 is again rendered conducting, which action re-energizes relay R4. The control circuits associated with relay R4 will be recognized as similar to those associated with relay R3 and it will be appreciated, therefore, that so long as control relay R2 remains energized, relay R4 is successively energized and de-energized, the length of each energized interval being determined by the characteristics of the adjustable condenser C4 and the duration of each de-energized interval being determined by the characteristics of the adjustable grid condenser C5. Moreover, the hammering valve 80 is energized during each energized interval of the relay R4 and de-energized during each de-energized interval of the relay R4, thus rendering the associated hammering ram effective to deliver a succession of hammer-like blows to the work.

The initial closure of contacts R2a also energizes the primary windings of the grid transformer T11 and the plate transformer T12, associated with valve V5. Upon being energized, transformer T11 balances or substantially balances the voltage applied to the grid of valve V5 by means of the control transformer T2, enabling the variable grid condenser C5 to start to discharge the energy initially stored therein by transformer T2. At the expiration of a period determined by the characteristics of condenser C5 and the associated discharge circuit, the grid of valve V5 falls to a value at which valve V5 becomes conducting. At this time, control relay R5 is immediately energized by transformer T12 through valve V5. Upon being energized, relay R5 closes its transfer contacts R5a and R5c and opens its transfer contacts R5b and R5d.

The opening of transfer contacts R5d immediately de-energizes the winding of the low heat contactor LH and the closure of contacts R5c immediately energizes the winding of the high heat contactor HH, the circuits for both whereof also include the now closed pressure switch 180. Contactor HH is provided with normally open contacts HHa, which contacts are associated with the primary winding of transformer WT, and it will be obvious that the energization of contactor HH adjusts transformer WT to apply a higher value of welding current. It will further be obvious from previous description, that the lower value of welding current, as determined by contactor LH, is applied at the beginning of the welding cycle and that the transfer to the higher value of welding current, determined by contactor HH, is made at the expiration of an interval determined by the timing of valve V5, which valve is preferably timed to make the change from high heat to low heat somewhat after the time that the hammering is initiated.

Transfer contacts R5a and R5b are protective contacts, it being obvious that the opening of contacts R5b during the above transfer action interrupts the circuit for the welding contactor W, and that the closure of contacts R5a again enables the circuit for the welding contactor to be closed under the control of the impulsing contacts R3a. Contacts R5a and R5b insure that the primary welding circuit is open during the transfer period.

The initial closure of the pressure switch, at the beginning of the welding cycle now being described, also completes obvious energizing circuits for the primary windings of the grid transformer T13 and the plate transformer T14, associated with the over-all timing valve V6. Upon being energized, transformer T14 applies an alternating potential to valve V6 and transformer T13 balances or substantially balances the voltage applied to the grid of valve V6 by the previously energized transformer T3. The latter balancing action enables the energy previously stored in the grid condenser C6 by transformer T3 to slowly discharge through the timing circuit associated with condenser C6 and at the expiration of the timing interval thus afforded, valve V6 is rendered conducting. When valve V6 is rendered conducting, control relay R6 is energized and thereupon closes its normally open contacts R6a and opens its normally closed contacts R6b.

The opening of contacts R6b immediately de-energizes the plate transformer associated with the current impulsing valve V3. If this action occurs during a de-energized period of the impulsing relay R3, it obviously prevents a subsequent re-energization of this relay. If this action occurs during an interval that relay R3 is energized, relay R3 remains energized for the balance of the timing period provided by its associated condenser C1 and then resumes the de-energized condition. In either event, the de-energization of transformer T6 interrupts the operation of the current impulsing relay R3 and consequently results in the de-energization of the welding contactor W. The latter action, which causes the contacts W1 to open, obviously interrupts the flow of welding current to the electrodes 22—24.

The closure of control relay contacts R6a completes an energizing circuit through the pressure switch 180 for the primary winding of the grid transformer T15, associated with the cool-time valve V1, which action immediately applies a blocking potential to the grid of valve V1, rendering the latter non-conducting. This action interrupts the supply of current to the coil of relay R1 from transformer T4, but does not immediately de-energize this relay because of the local discharge circuit, including the coil of relay R1 and the associated timing condenser C7. At the expiration of a period determined by the characteristics of this discharge circuit, sufficient to allow the weld to set, relay R1 resumes the de-energized position, re-opening its contacts R1a and R1b.

The opening of contacts R1a de-energizes the solenoid 68a, associated with the clamping valve 68, which action, it will be recalled from the description of Fig. 1, connects the clamping ram to exhaust. This latter action also relieves the pressure on the pressure switch 180, enabling this switch to open.

The opening of contacts R1b immediately de-energizes the plate transformer T5, associated with the hammering control relay R2, interrupting the supply of energizing current to this relay, which relay thereupon resumes the de-energized position, re-opening contacts R2a. The latter action interrupts the energizing circuit for the plate transformer T9, associated with the impulsing relay R4, which action interrupts the intermittent energizations of the hammering valve 80, thereby interrupting the hammering action, at substantially the same time the pressure on the clamping ram is relieved.

The re-opening of the pressure switch 180 de-energizes the control transformer T15, associated with valve V1, the control transformer T6, associated with valve V3, and the control transformers T11 and T12, associated with valve V5. The de-energization of transformer T15 renders valve V1 conducting, in readiness for the initiation of a new operating cycle. The de-energization of transformers T6 and T12 serves merely to interrupt the sources of supply for the control relays R3 and R5, restoring these relays to the original de-energized conditions. The de-energization of transformer T11 again renders the valves V5 and V6 non-conducting. The re-opening of contacts R2a also de-energizes transformers T13 and T14, resulting, respectively, in the re-application of a blocking potential to the grid of valve V6 and the de-energization of relay R6. It will be appreciated, therefore, that the energization of relay R6, in addition to interrupting the flow of current, also results in the termination of the cycle, restoring the system to the original condition, in readiness for a new operating cycle.

Reviewing the above cycle of operation, it will be recalled that the closure of the starting switch B serves to energize low pressure valve 68, which action enables the low pressure ram 36 to bring the electrodes into clamping engagement with the work, and which latter action, through the pressure switch, initiates the impulsing of the welding contactor W, enabling the welding transformer WT to supply welding current to the work in a succession of impulses. The value of the welding current thus supplied is determined by the low heat contactor LH.

The closure of the starting switch also conditions the high pressure impulsing relay R2, which at the expiration of a period determined by the timing on condenser C3, actuates, through valve V4, the high pressure impulsing relay R4. Relay R4, in turn, through its associated impulsing circuit, successively energizes and de-energizes the high pressure valve 80, thus enabling the high pressure ram to apply a succession of hammer-like blows to the work. These hammer-like blows are initiated, in turn, at an adjustable interval after the initiation of the flow of welding current, and it will be appreciated that in the broader aspects of the invention, the delay between the initiation of the flow of welding current and the beginning of the hammer-like blows can be varied between relatively wide limits. The exact degree of the delay is determined, in practice, by the character and relative sizes of the work-pieces and it is usually preferred to delay the hammering action until such a time as the contacting surfaces of the workpieces reach a welding temperature. It will further be recalled that the closure of the pressure switch started the timing of relay R5 and that at the expiration of a period determined by the timing elements associated with valve V5, relay R5 was energized to de-energize the low heat contactor and energize the high heat contactor. It will further be appreciated that the timing interval for relay R5 is adjustable, independently of the timing of the high pressure ram. Thus, in the broader aspects of the invention, the change from low heat to high heat conditions can be made either before, substantially simultaneously with, or after the beginning of the hammering action. In general, it is preferred to make the change from low heat to high heat somewhat after the initiation of the hammering action.

It will further be recalled that the closure of the pressure switch started the timing of the over-all relay R6 and that at the expiration of a predetermined interval, relay R6 operates to interrupt the flow of welding current and to start the timing out of the hold time relay RI. In the present instance, the low pressure ram and the high pressure rams are both maintained effective during the just-mentioned hold time, thus affording a period after the interruption of the welding current during which the hammering action occurs. At the expiration of the just-mentioned hold time, however, both the low pressure and the high pressure rams are de-energized and the system is restored to its original condition, in readiness for a new operating cycle.

Although only a single specific embodiment of the invention has been described, it will be appreciated that various modifications in the form, number and arrangement of parts may be made within the spirit and scope of the invention.

What is claimed is:

1. In a timing control system, the combination of a translating means, an electric valve having an anode circuit and a control electrode, means coupling a source of power and said translating means to said anode circuit, first and second potential elements electrically connected to said control electrode in such relation that when only said first element is energized it applies a blocking potential to said control electrode but when both said first and second elements are energized the potentials thereof bring the potential of said control electrode to a value which renders said valve conducting, control means for sequentially energizing said first and second elements, and timing means electrically connected to said control electrode and charged by the energization of said first element for maintaining a blocking potential on said control electrode for a predetermined period after both said elements are energized.

2. In a timing control system, the combination of the transating means, an electric valve having an anode circuit and a control electrode, means coupling said translating means and a source of power to said anode circuit, a pair of differentially connected transformers having secondary windings connected in series relation with said control electrode, means for sequentially energizing said transformers, and timing means comprising a condenser electrically coupled to said control electrode and charged in the interval between the successive energizations of said transformers for maintaining a predetermined potential on said control electrode for a predetermined period after both said transformers are energized.

3. In an electrical control system for a load circuit having a source of current associated therewith, a first translating device for controlling current flow from said source through said load circuit, a second translating device for controlling another characteristic of said load circuit, control means, means responsive to said control means for actuating said first translating device to cause current to flow in said load circuit for a predetermined period, additional means responsive to said control means for supplying a predetermined succession of current impulses to said second translating means during said period, and time delay means for delaying the initial said impulse for a predetermined period following said actuation of said control means.

4. In an electrical control system for a load circuit having a source of current associated therewith, a first translating device for controlling current flow from said source through said load circuit, a second translating device for controlling another characteristic of said load circuit, control means, means responsive to said control means for actuating said first translating device to cause current to flow in said load circuit for a predetermined period, and additional means responsive to said control means for supplying a predetermined succession of current impulses to said second translating means throughout an interval beginning a predetermined time after the start of said period and ending a predetermined time after the end of said period.

5. In an electrical control system for a load circuit having a source of current associated therewith, a first translating device for controlling current flow from said source through said load circuit, a second translating means for controlling another characteristic of said load circuit, a first electric valve having principal electrodes between which said first translating means is connected, a second electric valve having principal electrodes between which said second translating means is connected, control means, means responsive to said control means for rendering said first valve conductive whereby to actuate the corresponding translating means, additional means responsive to said control means for controlling said second valve so as to supply said second translating means with a succession of current impulses, and time delay means for delaying the initial said impulse for a predetermined period following said actuation of said control means.

6. In a timing control system, the combination of a translating means, an electric valve having an anode circuit and a control electrode, means coupling a source of power and said translating means to said anode circuit, first and second potential elements electrically coupled to said control electrode in such relation that when only said first element is energized it applies a blocking potential to said control electrode but when both said first and second elements are energized the potentials thereof bring the potential of said control electrode to a value which renders said valve conducting, control means for energizing said first element, and additional control means effective after operation of said first-mentioned control means for energizing said second element.

7. In a timing control system, the combination of a translating means, an electric valve having an anode circuit and a control electrode, means coupling a source of power and said translating means to said anode circuit, first and second potential elements electrically coupled to said control electrode in such relation that when only said first element is energized it applies a blocking potential to said control electrode but when both said first and second elements are energized the potentials thereof bring the potential of said control electrode to a value which renders said valve conducting, control means for sequentially energizing said first and second elements, and timing means electrically coupled to said control electrode and effective to maintain a blocking potential thereon for a predetermined period after both said elements are energized.

8. In a timing control system, the combination of a translating means, an electric valve having an anode circuit and a control electrode, said valve having one conductive condition when a first potential is applied to said control electrode and having a different conductive condition when a second potential is applied to said control electrode, means coupling a source of power and said translating means to said plate circuit, first and second potential elements electrically coupled to said control electrode in such relation that when only said first element is energized it applies one of said potentials to said control electrode but when both said first and second elements are energized they bring said control electrode to the other of said potentials, control means for energizing said first element, and additional control means effective after operation of said first-mentioned control means for energizing said second element.

9. In a timing control system, the combination of a translating means, an electric valve having an anode circuit and a control electrode, said valve having one conductive condition when a first potential is applied to said control electrode and having a different conductive condition when a second potential is applied to said control electrode, means coupling a source of power and said translating means to said plate circuit, first and second potential elements electrically coupled to said control electrode in such relation that when only said first element is energized it applies one of said potentials to said control electrode but when both said first and second elements are energized they bring said control electrode to the other of said potentials, control means for energizing said first element, additional control means effective after operation of said first-mentioned control means for energizing said second element, and timing means for delaying the bringing of said control electrode to said other potential after energization of said second element.

10. In a timing control system, the combination of a translating means, an electric valve having an anode circuit and a control electrode, said valve having one conductive condition when a first potential is applied to said control electrode and having a different conductive condition when a second potential is applied to said control electrode, means coupling a source of power and said translating means to said anode circuit, first and second potential elements electrically coupled to said control electrode in such relation that when only said first element is energized it applies one of said potentials to said control electrode but when both said first and second elements are energized they bring said control electrode to the other of said potentials, control means for energizing said first element, additional control means effective after operation of said first-mentioned control means for energizing said second element, and means including a reactive element energized concurrently with the energization of said first element for delaying the bringing of said control electrode to the other of said potentials after energization of said second element.

11. In a timing control system, the combination of a translating means, an electric valve having an anode circuit and a control electrode, said valve having one conductive condition when a first potential is applied to said control electrode and having a different conductive condition when a second potential is applied to said control electrode, means coupling a source of power and said translating means to said plate circuit, first and second potential elements electrically coupled to said control electrode in such relation that when only said first element is energized it applies one of said potentials to said control electrode but when both said first and second elements are energized they bring said control electrode to the other of said potentials, control means for sequentially energizing said first and second elements, and timing means electrically coupled to said control electrode and effective to delay the bringing thereof to said other potential for a period after both said elements are energized.

12. In a system for controlling the continuity of an electric circuit, a translating means, an electric valve having an anode circuit and a control electrode, means coupling a source of power and said translating means to said anode circuit, first and second potential elements electrically coupled to said control electrode in such relation that when only said first element is energized it applies a blocking potential to said control electrode but when both said first and second elements are energized the potentials thereof bring the potential of said control electrode to a value which renders said valve conducting, means for energizing said first element, control means operable to close said electric circuit and to energize said second element so as to actuate said translating means by a flow of current in said anode circuit, and means operably responsive to the actuation of said translating means for interrupting said electric circuit.

13. In a system for controlling the continuity of an electric circuit, the combination of a translating means, an electric valve having an anode circuit and a control electrode, means coupling said translating means and a source of power to said anode circuit, a pair of differentially connected transformers having secondary windings connected in series relation with said control electrode, means for energizing one of said transformers so as to apply a blocking bias to said control electrode, control means operable to cause closure of said electric circuit and to energize the other of said transformers, timing means for maintaining a blocking potential on said control electrode for a predetermined period after said other transformer is energized, said translating means being actuated by flow of current in said anode circuit at the expiration of said period, and means operably responsive to the actuation of said translating means for interrupting said electric circuit.

14. In a system for controlling the continuity of an electric circuit, the combination of an electromagnetic relay, an electric valve having an anode circuit and a control electrode, means coupling said relay and a source of power to said anode circuit, a pair of differentially connected transformers having secondary windings connected in series relation with said control electrode, one of said transformers being normally energized so as to apply a blocking potential to said control electrode, control means for effecting closure of said electric circuit and for energizing said other transformer, timing means for maintaining a blocking potential on said control electrode for a predetermined period after energization of said other transformer, said relay being energized by flow of current in said anode circuit at the expiration of said period, and means responsive to the actuation of said relay for interrupting said electric circuit.

CLETUS J. COLLOM.